J. L. RUMPF.
ATTACHMENT FOR MOWING OR OTHER AGRICULTURAL MACHINES.
APPLICATION FILED MAR. 26, 1918.
1,289,922.
Patented Dec. 31, 1918.
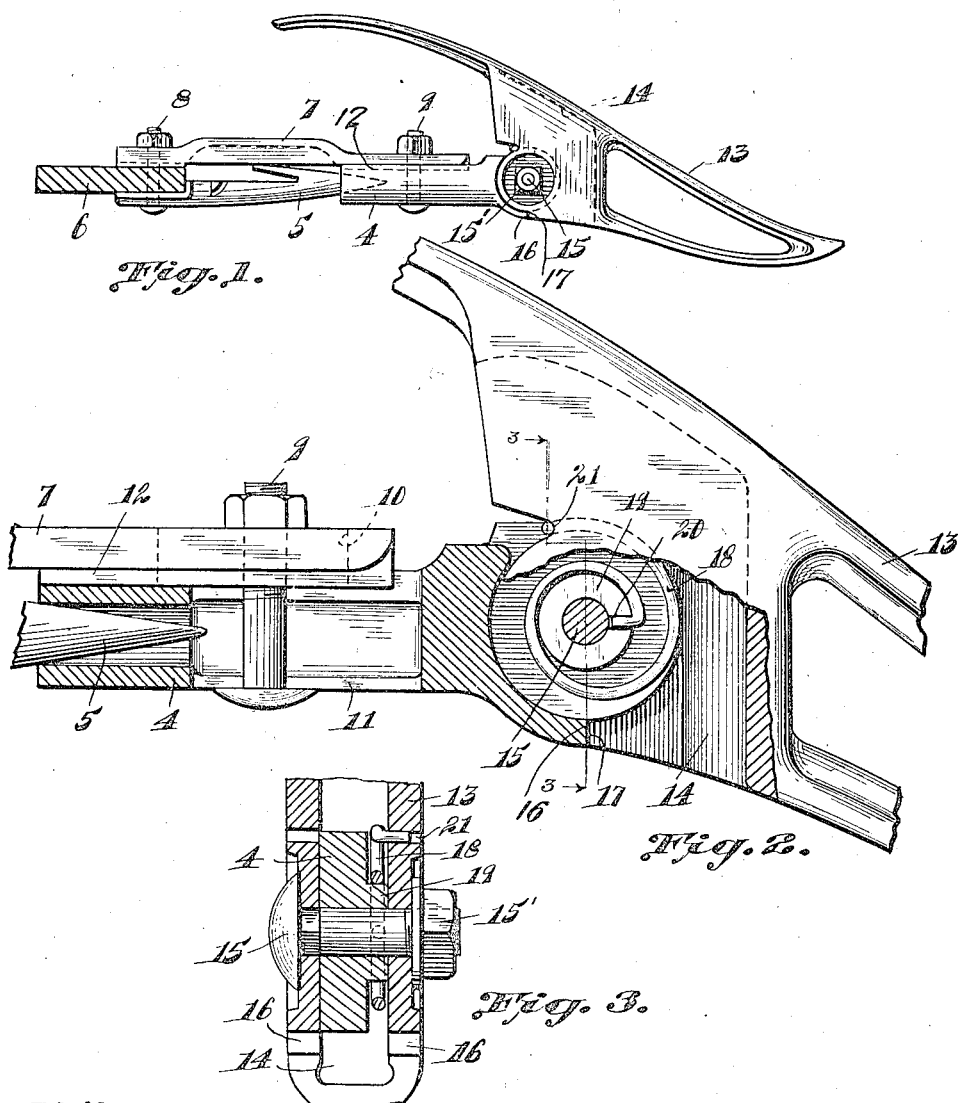

UNITED STATES PATENT OFFICE.

JOHN L. RUMPF, OF CHICAGO, ILLINOIS, ASSIGNOR TO THE WHITAKER MANUFACTURING COMPANY, OF CHICAGO, ILLINOIS, A CORPORATION OF ILLINOIS.

ATTACHMENT FOR MOWING OR OTHER AGRICULTURAL MACHINES.

1,289,922.  Specification of Letters Patent.  Patented Dec. 31, 1918.

Application filed March 26, 1918. Serial No. 224,709.

*To all whom it may concern:*

Be it known that I, JOHN L. RUMPF, a citizen of the United States, and a resident of the city of Chicago, county of Cook, and State of Illinois, have invented certain new and useful Improvements in Attachments for Mowing or other Agricultural Machines, of which the following is a specification.

My invention relates to improvements in attachments for mowing or other agricultural machines, and more specifically to an attachment of this character designed for use in connection with fallen or blown down grain in order to raise the same so as to be engageable by the cutting element of the machine when passed over by the latter.

The object of my invention is the production of an attachment as mentioned, which will be of durable and economical construction, and in which improved means for yieldingly holding the lifter-guard of the attachment at its lower terminal of movement will be employed. A further object is the production of an attachment as mentioned, in which the resilient means mentioned will be so arranged as to be incapable of becoming entangled in the grain or other material through which the machine passes when in use.

Other objects will appear hereinafter.

The invention consists in the combinations and arrangements of parts hereinafter described and claimed.

The invention will be best understood by reference to the accompanying drawings forming a part of this specification, and in which, Figure 1, is a side elevation of an attachment embodying the invention, the same being shown applied to the finger-bar and one of the knife-guards of a conventional mower or harvester, Fig. 2, an enlarged, partially sectional, side elevation of the central portion of the construction shown in Fig. 1, and Fig. 3, a section taken substantially on line 3—3 of Fig. 2.

The preferred form of construction as illustrated in the drawings, comprises a supporting arm 4, which is hollow at its rearward end for engagement with the front end of one of the knife-guards 5 attached to the finger-bar 6 of a conventional mower or harvester. The member 4 is securely fastened to the finger-bar 6 by means of a connecting bar 7, the rearward end of which is secured to said finger-bar by a bolt fastening 8. The front end of the bar 7 is connected with the rearward end of member 4 by a bolt fastening 9, the parts 7 and 4 being formed with elongated slots 10 and 11, respectively, for engagement with the bolt in order to permit of relative longitudinal adjustment of the parts, as will be readily understood. The under side of bar 7 is formed with a longitudinally extending tongue 12, which engages in the channeled upper side of the member 4, whereby said parts are securely locked against any relative pivotal movement.

To the front end of the member 4 is attached the lifter-guard 13, the same being provided intermediate its ends with a rearwardly and downwardly opening recess 14, into which projects the reduced front end of supporting arm 4. The lifter-guard is pivotally connected with said front end of arm 4 by means of a bolt 15 and coöperating nut 15', the arrangement being such that limited rotative movement thereon is permitted said lifter-guard.

Downward rocking of the front end of said lifter-guard is limited by a shoulder 16 provided thereon, which engages against a stop-shoulder 17 formed at the front end of supporting arm 4. Upward yielding of the front end of said lifter-guard is resisted by a coiled torsional spring 18 which encircles the pivotal axis of the lifter-guard. The front end of supporting arm 4 is formed with a hub 19 which serves to space said arm from one side of the recess 14 in order to accommodate said spring, as clearly seen in Fig. 3, the inner end of said spring engaging in an outwardly opening notch 20 formed in said hub. With this arrangement, it will be seen that the adjacent side or wall of the recess 14 will serve to hold the inner end of the spring in engagement with said notch. The outer end of the spring projects laterally and engages with a shoulder or notch 21 formed at the rearward edge of the adjacent side or wall of recess 14.

With the construction set forth, it will be seen that the front end of the lifter-guard will be normally held at its lower terminal of its rotative movement by the spring 18, said spring, however, permitting of upward yielding of said end of the lifter-guard when necessary in the operation of the machine, as will be readily understood by those skilled in the art. The construction is such that the spring is inclosed in the lifter-guard, the same being fully protected by the sides or walls of recess 14. This being the case, said spring is fully guarded against becoming entangled in the grain or other substance through which the device is projected during operation of the machine; this being highly important, inasmuch as it has been found that in devices of this character in use at the present time, where the springs employed in connection with the lifter-guard are exposed to any extent, the same become entangled with the grain, etc., and to this extent interfere with and retard operation of the machine.

While I have illustrated and described the preferred form of construction for carrying my invention into effect, this is capable of variation and modification without departing from the spirit of the invention. I therefore, do not wish to be limited to the precise details of construction set forth, but desire to avail myself of such variations and modifications as come within the scope of the appended claims.

Having described my invention, what I claim as new and desire to secure by Letters Patent is:—

1. An attachment of the class described for mowing or other agricultural machines, comprising a supporting element connected with and projecting from the machine; a lifter-guard having a rearwardly opening recess into which the front end of said supporting element projects; a pivotal connection between said lifter-guard and said front end of said supporting element permitting of vertical swinging of said lifter-guard; and a torsional spring arranged in said recess and encircling the pivotal axis of said lifter-guard for normally holding the front end of the latter at its lower terminal of movement, one terminal of said spring engaging against a shoulder on said lifter-guard and the other terminal of said spring engaging in a notch provided in one side of said supporting element, substantially as described.

2. An attachment of the class described for mowing or other agricultural machines, comprising a supporting element connected with and projecting from the machine; a lifter-guard having a rearwardly opening recess into which the front end of said supporting element projects; a pivotal connection between said lifter-guard and said front end of said supporting element permitting of vertical swinging of said lifter-guard; a torsional spring arranged in said recess and encircling the pivotal axis of said lifter-guard for normally holding the front end of the latter at its lower terminal of movement, one terminal of said spring engaging against a shoulder on said lifter-guard; and a hub on said end of said supporting element around which said spring engages, the said hub having an outwardly opening notch for engagement by the inner end of said spring, substantially as described.

3. An attachment of the class described, for mowing or other agricultural machines, comprising a supporting element engaged with and projecting from the machine; a lifter-guard having a rearwardly opening recess into which the front end of said supporting element projects; a pivotal connection between said lifter-guard and said front end of said supporting element, permitting of rotative movement of said lifter-guard about a horizontal axis; a coiled torsional spring arranged in said recess and encircling the pivotal axis of said lifter-guard for normally holding the front end of the latter at its lower terminal of rotative movement, one terminal of said spring engaging against a shoulder on said lifter-guard; and a hub on said end of said supporting element around which said spring engages, the said hub having a laterally opening notch for engagement by the inner end of said spring, the adjacent wall of said lifter-guard serving to hold said inner end of said spring against lateral displacement from said notch, substantially as described.

In testimony whereof I have signed my name to this specification in the presence of two subscribing witnesses.

JOHN L. RUMPF.

Witnesses:
CHARLES A. SWANSON,
O. L. STELL.

Copies of this patent may be obtained for five cents each, by addressing the "Commissioner of Patents. Washington, D. C."